United States Patent

Duttarer et al.

[11] 3,891,003
[45] June 24, 1975

[54] HYDRAULIC MANIFOLD

[75] Inventors: Ralph M. Duttarer, Buchanan; Richard R. Hushower, St. Joseph, both of Mich.

[73] Assignee: Clark Equipment Company, Buchanan, Mich.

[22] Filed: June 18, 1974

[21] Appl. No.: 480,327

[52] U.S. Cl............. 137/561 A; 137/270; 137/608; 180/77 S
[51] Int. Cl. .......................................... F16k 25/00
[58] Field of Search.............. 137/269, 270, 625.22, 137/625.24, 625.47, 625.46, 798, 561 A, 137/270; 251/366, 290; 285/136, 190; 180/77 S, 79.2 B

[56] References Cited
UNITED STATES PATENTS 3,129,644  4/1964  Andersen................. 137/625.47 X
3,568,778  3/1971  Swisher Jr. .................. 180/77 S X

*Primary Examiner*—Martin P. Schwadron
*Assistant Examiner*—Robert J. Miller
*Attorney, Agent, or Firm*—Kenneth C. Witt

[57] ABSTRACT

A manifold for reversing hydraulic connections when one part of the manifold is rotated through part of a revolution relative to the other. The manifold is particularly adaptable to a vehicle having an operator's station which part of the time faces in one direction and the remainder of the time is reversed and faces in the other direction. This manifold provides for automatically reversing the hydraulic connections when the operator's station is thus moved so that the operator's steering wheel always operates in the same mode or manner regardless of which direction the operator is facing.

5 Claims, 15 Drawing Figures

PATENTED JUN 24 1975  3,891,003

SHEET 3

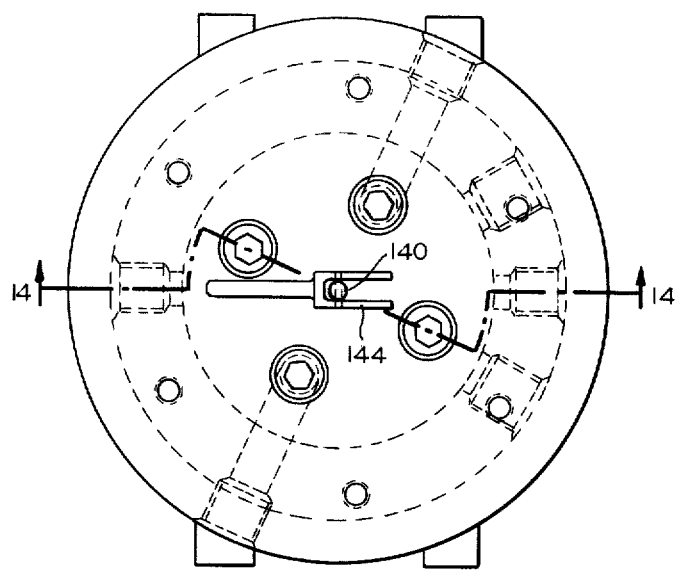
FIG. 13
FIG. 14
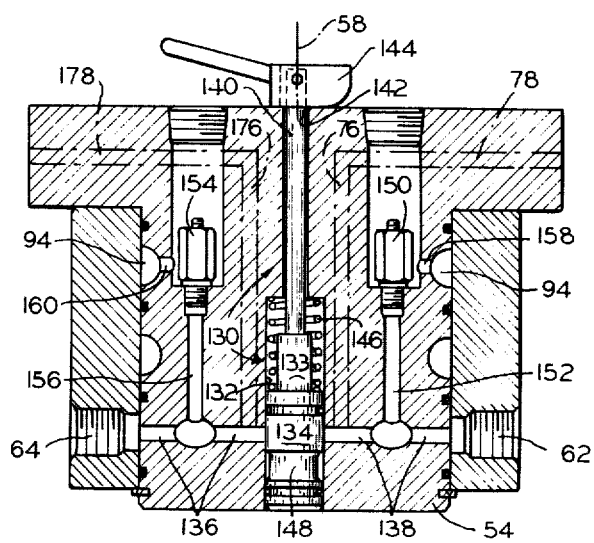
FIG. 15

HYDRAULIC MANIFOLD

The invention herein described was made in the course of or under a contract with the Department of Defense.

BACKGROUND OF THE INVENTION

1. Field of the Invention

This invention relates to a manifold for reversing hydraulic connections and is particularly useful in vehicles in which the operator's station can be located in either of two positions facing in opposite directions.

2. Description of the Prior Art

U.S. Pat. No. 3,563,329 Licari dated Feb. 6, 1971 is illustrative of the type of vehicle for which such an arrangement may be advantageous. The said patent discloses a vehicle comprising a two wheel tractor module with provisions for connecting to such tractor module a variety of implement modules to form different types of vehicles.

The object of the present invention is to provide a manifold for automatically reversing the hydraulic steering connections when the operator's station is reversed so that the steering mode remains the same regardless of which direction the operator is facing.

SUMMARY OF THE INVENTION

In carrying out this invention in one preferred form we provide a manifold for reversing hydraulic connections which includes an outer annular member and an inner circular member positioned in sealing relation within the outer member. The inner member is rotatable relative to the outer member and in a typical case it may be rotated through a full 360° but the two operating positions are 180° apart. There are connection ports in both the outer annular member and in the inner circular member and also passages in the inner member so arranged that in one position of the manifold one pair of connection ports on the outer member are connected respectively to a pair of ports on the inner member. When the inner member is rotated 180° with respect to the outer member the connections between the said two pairs of ports are reversed. There are two additional pairs of connection ports, one pair on the outer member and the other on the inner member. These two pairs are interconnected one-to-one also but in a manner such that the connections are not reversed when the inner member is pivoted 180°.

BRIEF DESCRIPTION OF THE DRAWING

FIG. 13 is a top view of the hydraulic manifold showing the addition of parts to the structure shown in the earlier figures;

FIG. 14 is a sectional view along the line 14—14 of FIG. 13; and

FIG. 15 is a partially sectional view similar to FIG. 14 except showing some of the parts in a different position.

DESCRIPTION OF PRFERRED EMBODIMENT

Figure 1:
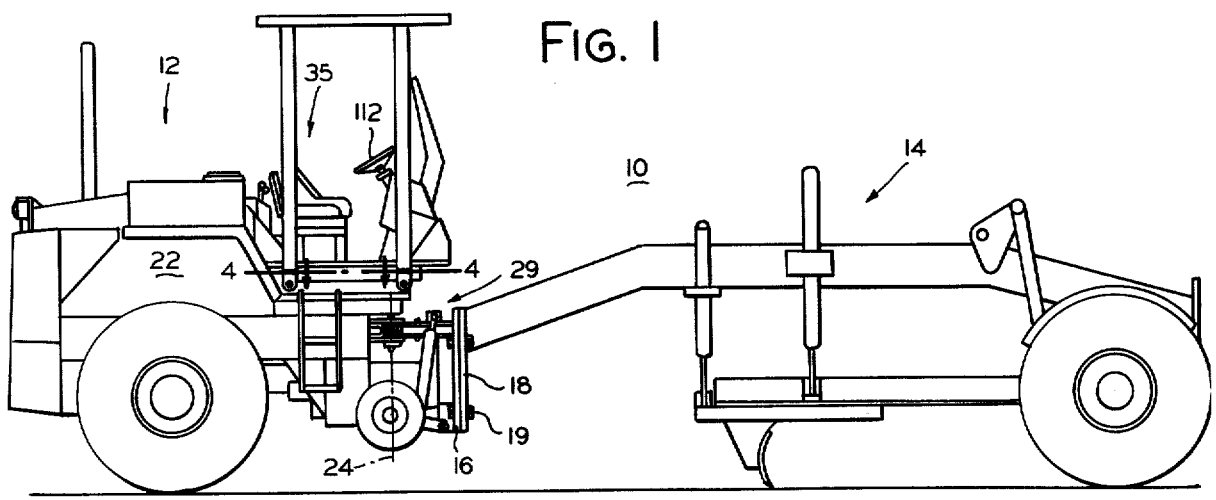
FIG. 1 is a schematic side elevational view showing a complete vehicle including a tractor module embodying the present invention coupled to an implement module.

Referring to FIG. 1 of the drawing, there is shown a complete articulated vehicle which is indicated generally by the numeral 10 and is composed of two separable parts, a tractor module indicated by the numeral 12 and an implement module indicated by the numeral 14. The implement module illustrated in FIG. 1 is a grader implement which when coupled to the tractor module as shown makes a complete articulated motor grader vehicle for the movement of dirt or other material by scraping and pushing. The tractor module 12 and the implement module 14 are detachably secured together at 16,18. That is, connection portion 16 which forms a part of the tractor module 12 is secured by means of bolts 19 or other equivalent means to plate 18 which forms a part of the implement unit 14.

Figure 2:
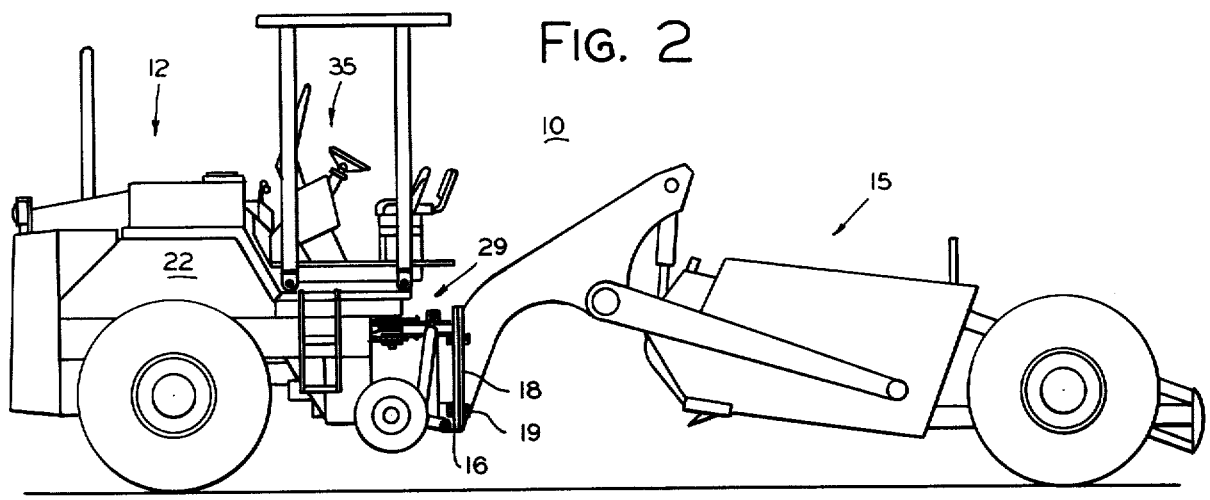
FIG. 2 shows the same tractor module as FIG. 1 coupled to a different implement module and with the operator's station reversed.

FIG. 2 of the drawing shows a complete vehicle which is composed of the same tractor module 12 coupled to a different implement module which is indicated by the numeral 15. Module 15 is a scraper mechanism, and when it is coupled to the tractor 12 as shown in FIG. 2 the result is a self-propelled articulated scraper vehicle which may be utilized for the movement of dirt and other materials. For use with a scraper module the operator's station 35 preferably is turned to face the other way, as shown. It will be understood that while only grader and scraper implement modules have been illustrated herein that bucket loaders, fork lifts, rollers and other implements may be utilized by attachment to tractor module 12 to provide complete self-propelled machines of the desired types.

As explained in the aformentioned U.S. Pat. No. 3,563,329, the connection portion 16 is pivotally connected to the body portion 22 of the tractor module 12 by means of a combined steering and draft coupling indicated generally by the numeral 29, which permits the portion 22 of the tractor to the left of centerline 24 to pivot about such centerline with respect to the remainder of the complete vehicle 10, or conversely. It is by such pivoting that the vehicle 10 is steered and the coupling 29 also acts as a portion of the frame structure of the vehicle, transmitting forces between the main body portion 22 and the remainder of the vehicle in both directions.

Figure 3:
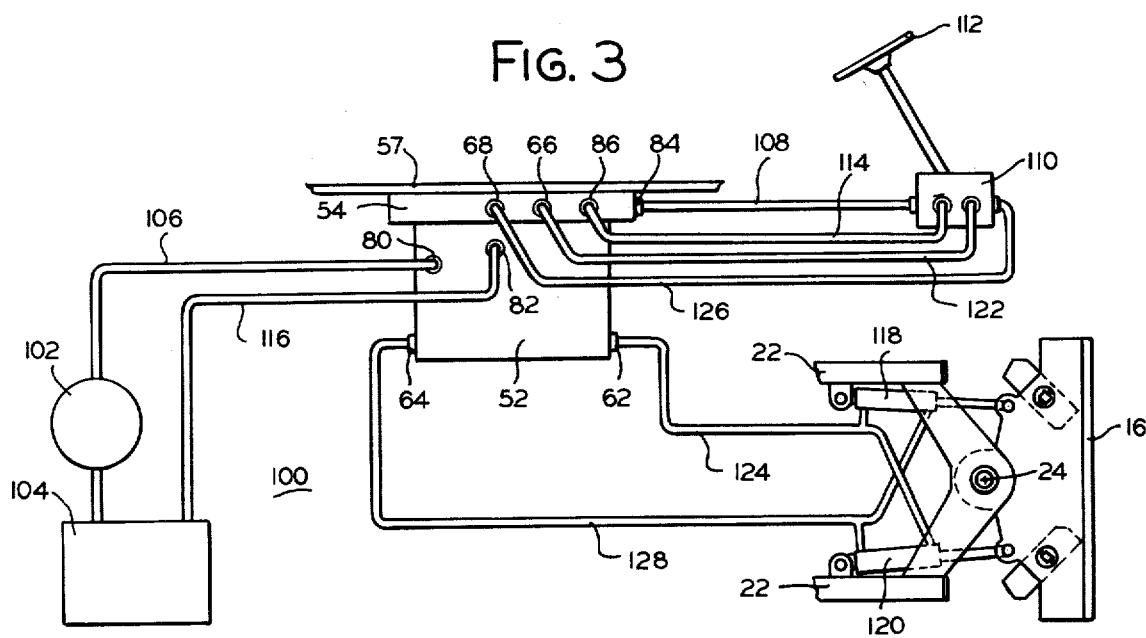
FIG. 3 is a diagram of the hydraulic steering circuit of the tractor module.

There is shown in FIG. 3 diagrammatically and schematically the steering system and mechanism for the vehicle 10 and this is described in detail hereinafter following a description of the manifold 50 which forms a portion of the steering system and apparatus. Manifold 50 is illustrated in FIGS. 4-15 inclusive.

Figure 5:
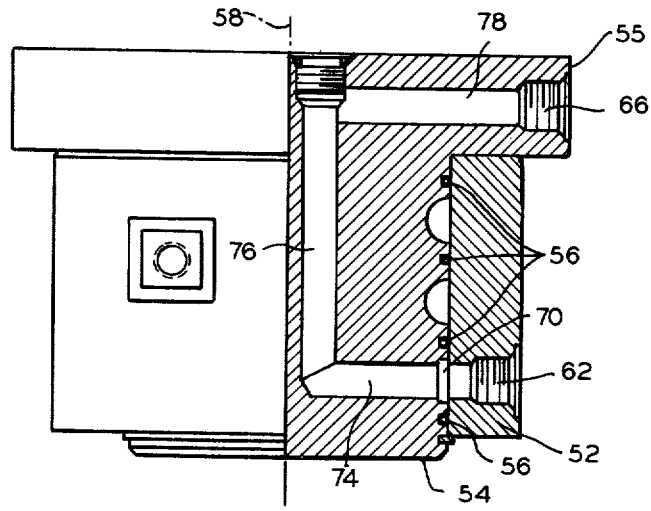
FIG. 5 is a developed sectional view along the line 5—5 of FIG. 4 and FIG. 6 showing one of the connection ports in the outer member, one of the connection ports in the inner member, and the connecting passages in one condition of the manifold.

As shown in these figures, the manifold 50 includes an outer annular or cylindrical member 52. An inner circular or spool member 54 is located within outer member 52 in sealing relation therewith. That is, there is a close fit between members 52 and 54, and O rings or other comparable means as indicated at 56 (see FIG. 5) are provided to seal the various ports and passageways described hereinafter from one another and from the atmosphere as necessary. The inner member 54 is provided with a flange portion 55 at the upper end thereof as seen in FIG. 5, and this portion is also at the top as the manifold 50 is installed in vehicle 10. The inner member 54 is rotatable through a complete revolution inside of outer member 52 for the purpose explained hereinafter, such rotation occurring about centerline 58. In the form of the invention described and illustrated herein the two operating positions are 180° apart but the inner member 54 of the manifold 50 can be turned in either direction to accomplish such 180° movement and thus it is capable of a complete revolution of 360°.

As shown, the outer member 52 is provided with bosses 60 which may be drilled and tapped to provide for securing the outer member to the frame of the body portion 22 of the tractor unit, while the inner portion 54 is secured to the bottom or floor 57 of the operator's station 35 whereby the movement of such operator's station 180° between the two operating positions illustrated in FIGS. 1 and 2 respectively moves the inner member 54 through the angle of 180° also and reverses the hydraulic connections to the steering mechanism.

Figure 6:
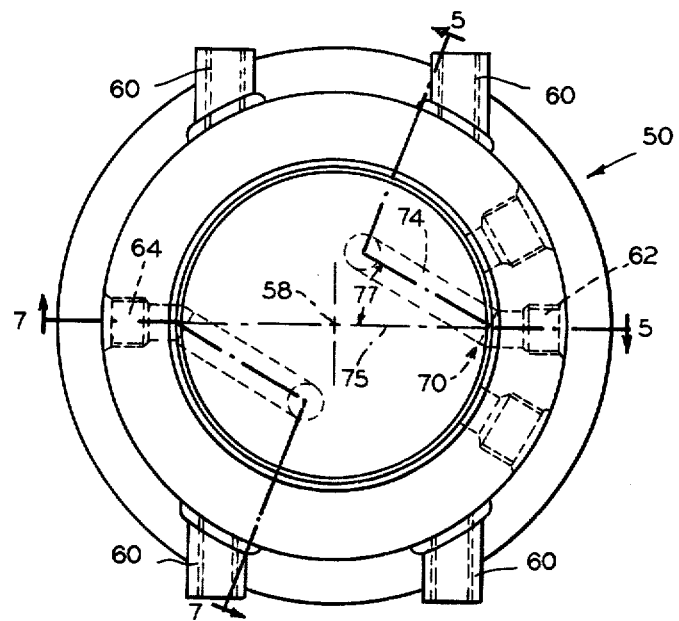
FIG. 6 is a bottom plan view of the manifold of FIGS. 4 and 5.

As shown in FIG. 6, there are two connection ports 62 and 64 through outer annular member 52, and such connection ports are located diametrically opposite each other. These two connection ports are connected to a pair of connection ports 66 and 68 in the inner member 54. In the position shown in FIGS. 4, 5, 6, and 7 port 62 is connected to port 66 while port 64 is connected to port 68, but, as is explained hereafter, the connections can be reversed so that port 62 is connected to port 68 and port 64 is then connected to port 66.

As illustrated in FIG. 5, connection port 62 is joined to connection port 66 by means of an internal port at 70 on the outer surface of member 54 which is in register with port 62, and a passage having portions which extend in three different directions. As shown in FIG. 6, the first portion 74 of the passage extends at an angle 77 with respect to a diameter 75 extending from internal port 70 through the centerline 58. Portion 74 of the passage connects with a portion 76 (see FIG. 5) which is parallel to centerline 58, which in turn connects with portion 78 which extends radially outward to connection port 66. See FIG. 4 also for portion 78 and port 66.

Figure 4:
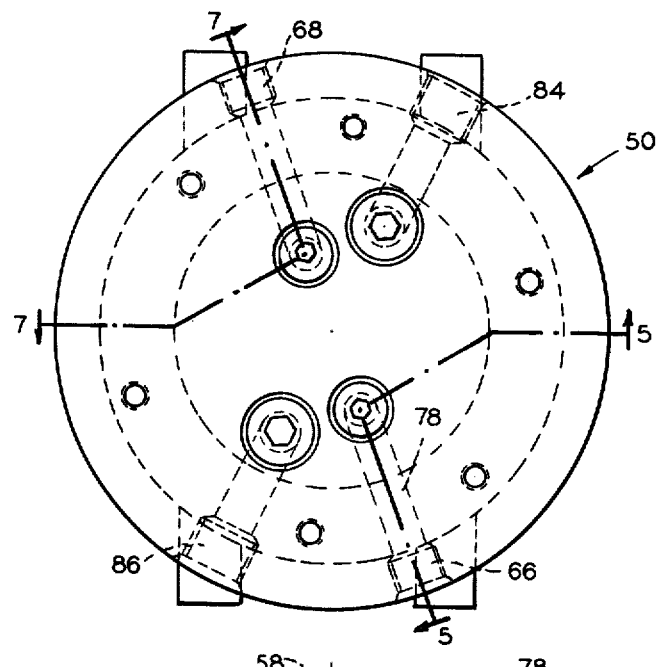
FIG. 4 is a top plan view of the hydraulic manifold included in the tractor module, the location of which is indicated approximately by the line 4—4 in FIG. 1.
Figure 7:
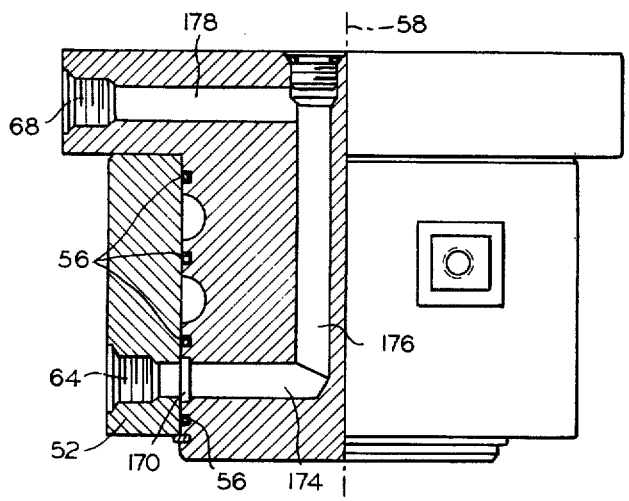
FIG. 7 is a developed sectional view along the line 7—7 of FIG. 4 showing other connection ports and the intervening passages.
Figure 8:
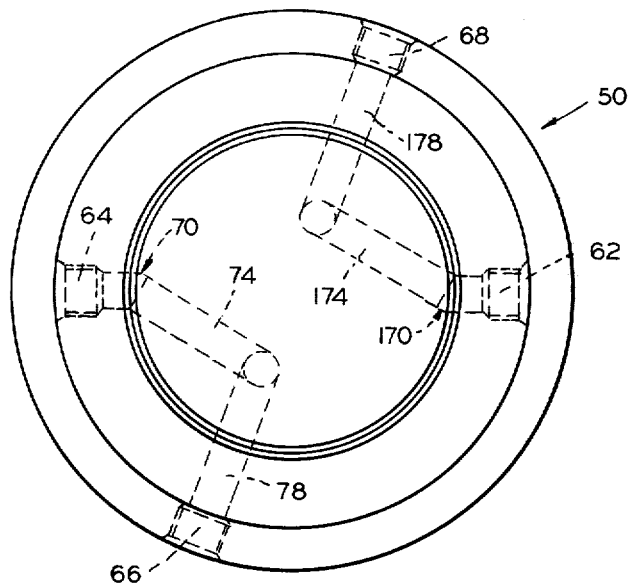
FIG. 8 is the same as FIG. 6 except with the inner member of the manifold rotated 180°.
Figure 9:
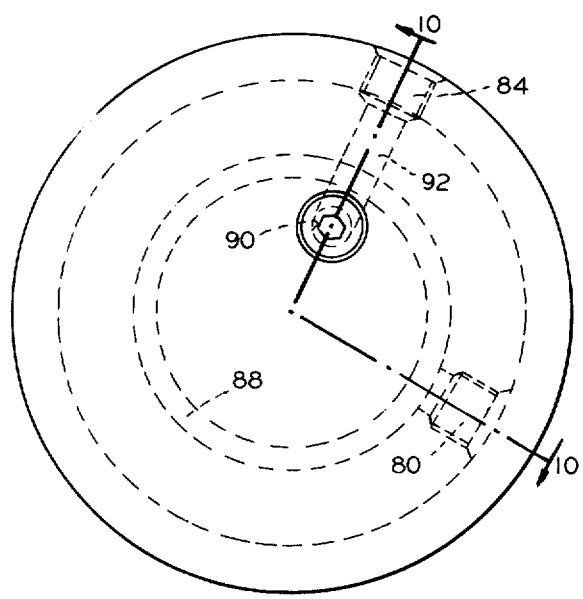
FIG. 9 is a plan view the same as FIG. 4 except with some ports omitted.

FIG. 7 is a view along the line 7—7 in FIGS. 4 and 6 and illustrates how a passage made up of internal port 170 on the outer surface of member 54 and passage portions 174, 176 and 178 similarly joins connection port 64 of the outer member with connection port 68 in the inner member. If inner member 54 is rotated 180°, the connections between the said two pairs of connection ports on the inner and outer members respectively are reversed because the outer member does not move. This is illustrated in FIG. 8 in which inner member 54 has been revolved 180°, and connection port 62 on the outer member is now connected to connection port 68 on the inner member by port 170 and passage 174, 176, 178 and it will be understood that connection port 64 on the outer member is similarly connected to connection port 66 on the inner member in this position of the manifold through port 70 and passage 74,76,78.

FIGS. 9, 10, 11 and 12 show two additional pairs of connection ports 80 and 82 on the outer member and 84 and 86 on the inner member. Passages are provided so that connection port 80 is always connected to connection port 84 regardless of the relative rotative position of the inner and outer members. Likewise, connection port 82 is always connected to connection port 86.

Figure 10:
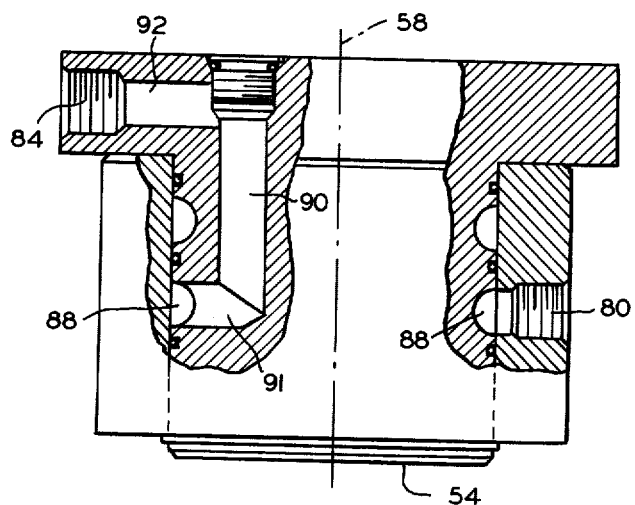
FIG. 10 is a partial sectional view along the line 10—10 of FIG. 9 showing other connection ports and a passageway.

In order to accomplish this, an annular groove 88 as shown in FIG. 10 is provided in the cylindrical surface of inner member 54 where it is in register with connection port 80 at all times; the groove 88 extends completely around the member 54. As may be seen in FIGS. 10 and 9, there is a passage connecting groove 88 with connection port 84, such passage comprising portion 90 which extends parallel to centerline 58 and radial portion 91 which joins portion 90 and groove 88. Intersecting passage portion 90 at the upper end is radially extending passage portion 92 which is open to connection port 84.

Figure 11:
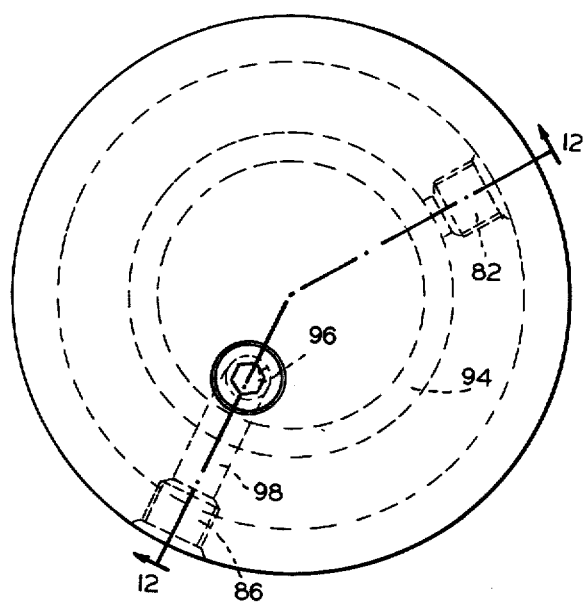
FIG. 11 is another view the same as FIG. 4 except with certain parts omitted.
Figure 12:
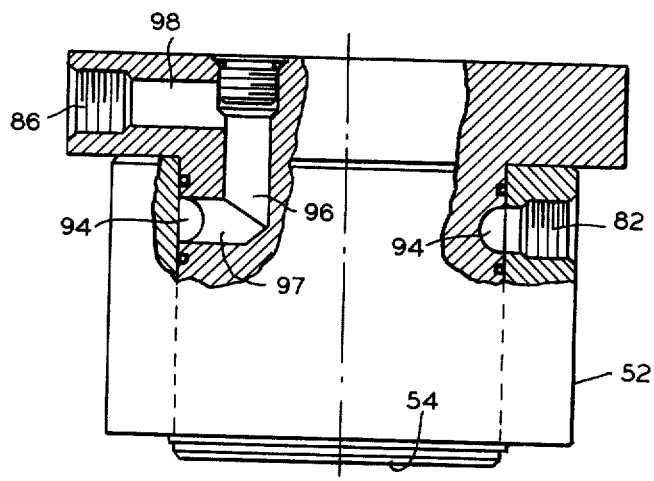
FIG. 12 is a developed fragmentary sectional view along the line 12—12 of FIG. 11 showing still other connection ports and an intervening passageway.

Connection port 82 in the outer member is similarly connected to connection port 86 in the inner member as shown in FIGS. 11 and 12. There is an annular groove 94 in member 54 which is in communication with connection port 82 at all times, and there is a passage comprising an axially extending portion 96 and radially extending portions 97 and 98 which provides a connection between connection port 86 and the groove 94, regardless of the relative rotative position of members 54 and 52.

Referring to FIG. 3 of the drawing, the manifold of the present invention is shown diagrammatically along with other parts of the steering system of vehicle 10. The hydraulic system is indicated generally by the numeral 100 and includes a hydraulic pump 102 which draws hydraulic fluid from a reservoir 104 and directs it through pressure conduit 106 into port 80 in the outer fixed member 52 of the manifold. From the port 80, through the passages previously described, such fluid flows through the manifold and out port 84 from where it passes through conduit 108 to the steering valve 110 which is operated by the operator's steering wheel 112 located at the operator's station 35.

The steering valve 110 may be of the so-called closed center type. When fluid is discharged from valve 110 it returns through conduit 114 to port 86 in the inner rotatable member of the manifold, from where it flows through the passages previously described to port 82 and thence returns through return conduit 116 to the reservoir 104 to be recirculated.

It will be appreciated that various ports of the manifold 52,54 are shown rotated out of position in FIG. 3 in order to simplify the diagram. Ports 62 and 64 are shown diametrically opposite each other as in the other figures but the other ports are not in the correct relative positions except that port 80 and port 82 are spaced axially of member 52 as is required to maintain a separation between the pressure and return portions of the hydraulic system.

FIG. 3 of the drawing also shows a fragmentary portion 57 of the floor of the operator's station of the vehicle to which the inner or movable member 54 of the manifold is secured. When the operator's station is reversed from the position shown in FIG. 1 to that shown in FIG. 2 the floor portion 57 is reversed and member 54 is likewise reversed. It will be appreciated that steering valve 110 and the operator's steering wheel 112 are secured to the floor 57 also whereby they all move as a unit.

In the typical steering system illustrated in FIG. 3, there are a pair of piston cylinder actuators or jacks 118 and 120 which are connected between the front body portion 22 of the vehicle and connection plate 16. These actuators are operated hydraulically in push-pull relationship to pivot body portion 22 with respect to connection plate 16 and the implement portion connected thereto, or conversely, in order to steer the vehicle by causing the front body portion 22 to pivot about axis 24 relative to the remainder of the vehicle.

As shown, conduit 122 is connected from the steering valve 110 to port 66 in the manifold and in the position shown in FIG. 3, port 66 is connected internally to port 62 in the manner explained previously. Port 62 in turn is connected by conduit 124 to the rod end of actuator 120 and the head end of actuator 118. Similarly, conduit 126 is connected from the steering valve 110 to port 68. Port 68 is connected to port 64 in the position shown and port 64 in turn is connected by conduit 128 to the head end of actuator 120 and the rod end of actuator 118.

When the operator's station is in the position illustrated by FIG. 3, which is the same as FIG. 1, if the operator turns the steering wheel 112 clockwise, a right turn will be executed by the vehicle; this assumes that the vehicle of FIG. 1 is moving toward the right. As a result of clockwise operation of steering wheel 112 steering valve 110 admits pressurized fluid through conduit 122, through the manifold 50, and through conduit 124 to extend actuator 118 and retract actuator 120, it being understood that the fluid discharged from the opposite ends of the actuators returns through conduit 128 and manifold 50 and conduit 126 to the steering valve.

When the operator's station is reversed as shown in FIG. 2, the connections of ports 62 and 64 are likewise reversed, as described previously. In FIG. 1 and in FIG. 3, port 62 is connected with port 66 and port 64 is connected with port 68. However, upon reversal as shown in FIGS. 2 and 8, port 62 is connected with port 68 and port 64 with port 66. It will be understood that as a result of this reversal the operator still is able to turn the operator's steering wheel clockwise in order to achieve a right turn and counterclockwise to achieve a left turn; this assumes that the vehicle of FIG. 2 is moving toward the left.

Because of the said reversal of connections the hydraulic actuators 118 and 120 operate in the opposite sense and this compensates for the fact that the operator is facing in the opposite direction. Thus the mode or manner of steering is the same for both directions, that is, a clockwise turn of the operator's steering wheel produces a right turn, and a counterclockwise movement produces a left turn.

Under some circumstances it is desirable to provide free circulation of hydraulic fluid between actuators 118 and 120 combined with pressure relief valves in the event that abnormally high pressures should occur. For example, if the vehicle 10 is towed, it will be appreciated that there is a tendency for the tractor portion 12 of the vehicle to pivot about axis 24 with respect to the remainder of the vehicle, and this may result in abnormally high pressures in actuators 118 and 120, because with the use of a closed circuit steering valve the fluid is trapped in the actuators and in the conduits and manifold. It will be understood further by those skilled in the art that this situation is aggravated by the fact that when the steering valve 110 is closed it is not possible to circulate fluid between the two actuators 118 and 120 even though they are interconnected because the moment arms of the actuators are not equal during movement. This means that the linear travel of the actuators is not equal, with the result that the volumes of the interconnected chambers in the actuators change at different rates and thus circulation of fluid between actuators is prevented.

The problem of excessive pressures arising under some conditions, such as when the vehicle 10 is being towed, can be alleviated by the addition to the manifold 50 of the structure illustrated in FIGS. 13, 14 and 15. It should be understood that the interconnection between the two sides of the steering circuit, that is, between conduits 124 and 128, plus two pressure relief valves is added to the structure which has been described heretofore. FIGS. 13, 14 and 15 do not show the complete manifold but only those passages and parts which have been added, plus sufficient structure from earlier figures to help illustrate the addition of the features mentioned to the manifold.

FIG. 13 shows a top view of the manifold with these features added, while FIG. 14 is a view along the line 14—14 of FIG. 13 showing a developed sectional view of various parts and passages. It will be appreciated that some of the parts in FIG. 14 are shown out of position and out of proportion in order that the single view may be used at least to illustrate the optional additional features mentioned.

As seen best in FIG. 14, there have been added to inner member 54 a two-part bore 130 on the centerline 58 of part 54. The larger diameter portion 132 of the bore extending up from the bottom houses a spool member 133 including a land portion 134. A conduit 136 interconnects port 64 and bore 132 while conduit 138 interconnects port 62 and port 132. In the position illustrated in FIG. 14, the land portion 134 provides a shutoff between conduits 136 and 138.

As shown in FIGS. 14 and 15, a rod 140 is provided, located inside smaller diameter portion 142 of the bore 130. At the top of rod 140 suitable means such as the cam member 144 is provided to be operated manually in order to lift rod 140 and the spool 133 attached thereto against the force of compression spring 146 which normally holds the spool 133 in the lower position of FIG. 14. When the cam member 144 is operated to the position shown in FIG. 15, the spool member 133 is moved upwardly so that the cutout portion 148 on the spool 133 is between conduits 136 and 138 and provides a fluid interconnection between the two conduits.

In this latter condition of the hydraulic system 100, fluid can circulate between steering actuator 118 and 120 through the manifold 50 to compensate for the mentioned different volumes of the chambers in the actuators 118 and 120 and assist in preventing the build-up of excessive pressures in the steering actuators and other related parts of the hydraulic system.

However, in order to make certain that the pressure does not exceed a predetermined amount relief valves may be added and these are illustrated in FIGS. 13 and 14. The numeral 150 illustrates a relief valve which is connected by conduit 152 to conduit 138. Similarly, the numeral 154 designates a relief valve which is connected by conduit 156 to conduit 136. In the event of excessive pressure in conduit 138, for example, the relief valve 150 will operate and discharge hydraulic fluid through passage 158 to the annular groove 94 which is connected to the discharge conduit 116 back to the reservoir. Similarly, excessive pressure in conduit 136 results in the operation of relief valve 154 when discharges fluid through passage 160 to annular groove 94. It will be appreciated that the respective relief valves 150 and 154 are operative whether or not conduit 136 is connected to conduit 138, that is, even though the spool 133 is in the position illustrated in FIG. 14 and there is no communication between conduit 136 and conduit 138, the relief valves nevertheless will perform their intended function in the event of excessive pressure in their respective portions of the hydraulic circuit.

The manifold 50 is illustrated in FIG. 14 in the same position as FIGS. 4 and 5. Passage portion 76,78 is shown schematically in FIG. 14 and at its lower end passage portion 76 communicates with conduit 138 and with port 62. Similarly, on the other side of the manifold device, passage portion 176,178 is shown and portion 176 communicates at the bottom with conduit 136 and port 64.

While we have described and illustrated herein a manifold in which the connections to the steering actuators are diametrically opposite each other and reversal of the connections is accomplished by turning the manifold member 54 through 180°, the present invention is not limited to this specific arrangement. It will be appreciated that it is possible to accomplish reversal and the other advantages of the present invention by appropriately locating the various ports and passages so that the inner member is turned through less than 180° in order to perform the said function. In such case, the inner member 54 may not be movable through a complete revolution of 360°.

Thus, while we have described and illustrated herein the best mode contemplated for carrying out our invention as prescribed in the statute, it will be appreciated that modifications may be made by those skilled in the art. It should be understood that we intend to cover by the appended claims all such modifications which fall within the true spirit and scope of our invention.

We claim:

1. A manifold for reversing hydraulic connections comprising, an outer annular member, an inner circular member positioned in sealing relation within the said outer member and rotatable relative to the outer member at least a part of a complete revolution, a first pair of connection ports in the said outer member, a second pair of connection ports in the said inner member, a first pair of internal passages in the said inner member connecting the said second pair of ports to a pair of internal ports in register with the said first pair of connection ports, the said first pair of passages arranged so that rotating the said inner member a partial turn relative to the said outer member reverses the hydraulic connections between the said first pair of connection ports and the said second pair of connection ports, a third pair of connection ports axially spaced in the said outer member, a fourth pair of connection ports in the said inner member, and means for maintaining hydraulic connections between the said third pair of connection ports and the said fourth pair of connection ports respectively regardless of the rotative position of the said inner member relative to the said outer member, the said means comprising a pair of grooves in the said inner member in communication with the said third pair of connection ports respectively and a second pair of internal passages in the said inner member interconnecting the said grooves and the said fourth pair of connection ports respectively.

2. A manifold as in claim 1 in which the said first pair of connection ports are located diametrically opposite each other in the said outer member, and the said partial turn is through an angle of 180°.

3. A manifold as in claim 1 in which the said grooves in the inner member in communication with the said third pair of connection ports are annular in configuration.

4. A manifold as specified in claim 1 in which the said inner circular member includes conduits interconnecting the said first pair of internal passages, and a normally closed valve for selectively opening the said conduits.

5. A manifold as specified in claim 1 in which the said inner circular member includes a pair of pressure relief valves connected respectively between the said first pair of internal passages and one of the said grooves.

* * * * *